United States Patent [19]

May et al.

[11] Patent Number: 5,082,867
[45] Date of Patent: Jan. 21, 1992

[54] FLAME RETARDANT FLEXIBLE POLYURETHANE FOAM COMPOSITIONS

[75] Inventors: David E. May, Williamsport; Richard S. Rose, West Lafayette, both of Ind.

[73] Assignee: Great Lakes Chemical Corporation, West Lafayette, Ind.

[21] Appl. No.: 413,701

[22] Filed: Sep. 28, 1989

[51] Int. Cl.$^5$ .............................................. C08K 5/52
[52] U.S. Cl. ...................................... 521/67; 524/144; 524/145; 558/91; 558/107; 558/158; 558/177
[58] Field of Search .................... 521/107; 524/144; 252/609; 558/91, 177, 108, 107, 145

[56] References Cited

U.S. PATENT DOCUMENTS

| | | | |
|---|---|---|---|
| 3,132,169 | 5/1964 | Birum et al. | 260/461 |
| 3,192,242 | 6/1965 | Birum et al. | 260/461 |
| 3,324,205 | 6/1967 | Carpenter | 260/963 |
| 3,344,112 | 9/1967 | Birum | 260/45.7 |
| 3,781,388 | 12/1973 | Jenkner et al. | 260/953 |
| 3,830,886 | 8/1974 | Davis et al. | 260/953 |
| 3,997,449 | 12/1976 | Wilkinson | 252/8.1 |
| 4,046,719 | 9/1977 | Stanaback | 260/2.5 |
| 4,083,825 | 4/1978 | Albright | 260/45.7 |
| 4,083,826 | 4/1978 | Albright | 260/45.7 |
| 4,240,953 | 12/1980 | Albright | 260/45.7 |
| 4,565,833 | 1/1986 | Buzzard et al. | 521/107 |
| 4,696,963 | 9/1987 | Albright et al. | 524/144 |

FOREIGN PATENT DOCUMENTS 2416663  4/1974  Fed. Rep. of Germany .

OTHER PUBLICATIONS

*Encyclopedia of Polymer Science and Technology*, vol. 7, pp. 1–3.
*Encyclopedia of Chemical Technology*, 3rd Edition, vol. 10, p. 348.

*Primary Examiner*—John Kight, III
*Assistant Examiner*—Duc Truong

[57] ABSTRACT

Flame retardant additive compositions for flexible polyurethane foam comprise pentabromodiphenyl ether and non-mutagenic halogenated alkyl phosphate ester mixtures of the formula:

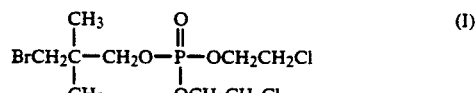

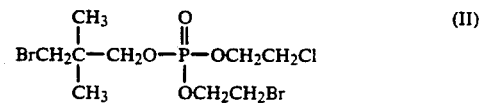

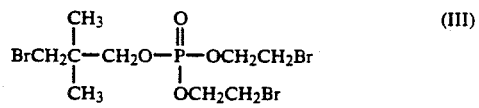

7 Claims, 1 Drawing Sheet

FLAME RETARDANT FLEXIBLE POLYURETHANE FOAM COMPOSITIONS

BACKGROUND OF THE INVENTION

1. Field of the Invention

The present invention relates to flame retardant flexible polyurethanes, foam compositions and more particularly to such compositions incorporating pentabromodiphenyl ether in combination with mixtures of halogenated alkyl phosphate esters containing aliphatic bromine and chlorine.

2. Description of the Prior Art

The need to reduce the flammability of polymeric systems while not adversely affecting the chemical, physical and mechanical properties or the appearance of polymeric systems is disclosed in the *Encyclopedia of Polymer Science and Technology*, Volume 7, pp. 1–3 and *The Encyclopedia of Chemical Technology*, 3rd Edition, Volume 10, p. 48.

Phosphorous-halogen systems have been widely used to flame retard polymeric systems. For example, the use of certain pentavalent phosphate esters containing bromine and chlorine as flame retardants is taught by Birum, et al., U.S. Pat. No. 3,132,169.

Other patents disclosing halogenated phosphate esters include Birum U.S. Pat. Nos. 3,192,242 and 3,344,112; Carpenter 3,324,205; Jenkner, et al. 3,781,388; Dow, et al. 3,830,886; Wilkinson 3,997,449; Stanaback 4,046,719; Albright 4,083,826 and 4,240,953; and West German OS 2,416,663. Albright, et al. U.S. Pat. No. 4,083,825 discloses the use of bis(2-chloroethyl) 2,2-dimethyl-3-bromopropyl phosphate as a flame retardant for polyurethane foams. Albright, et al. U.S. Pat. No. 4,696,963 discloses the use of flame retardant non-mutagenic mixtures of three halogenated alkyl phosphates and their use as flame retardants for various polymeric systems including flexible polyurethanes.

Pentabromodiphenyl ether is a halogenated aromatic flame retardant that has been employed in various polymeric systems. However, the prior art has not heretofore shown or suggested that combination of halogenated alkyl phosphates and pentabromodiphenyl ether would have any special advantages.

It is, thus, a primary object of this invention to provide highly effective flame retardant additive compositions of pentabromodiphenyl ether and mixtures of halogenated alkyl phosphates.

It is also an object of the present invention to provide effectively flame-retarded flexible polyurethane foams incorporating flame retardant additive composition of the character described.

SUMMARY OF THE INVENTION

Figure 1:
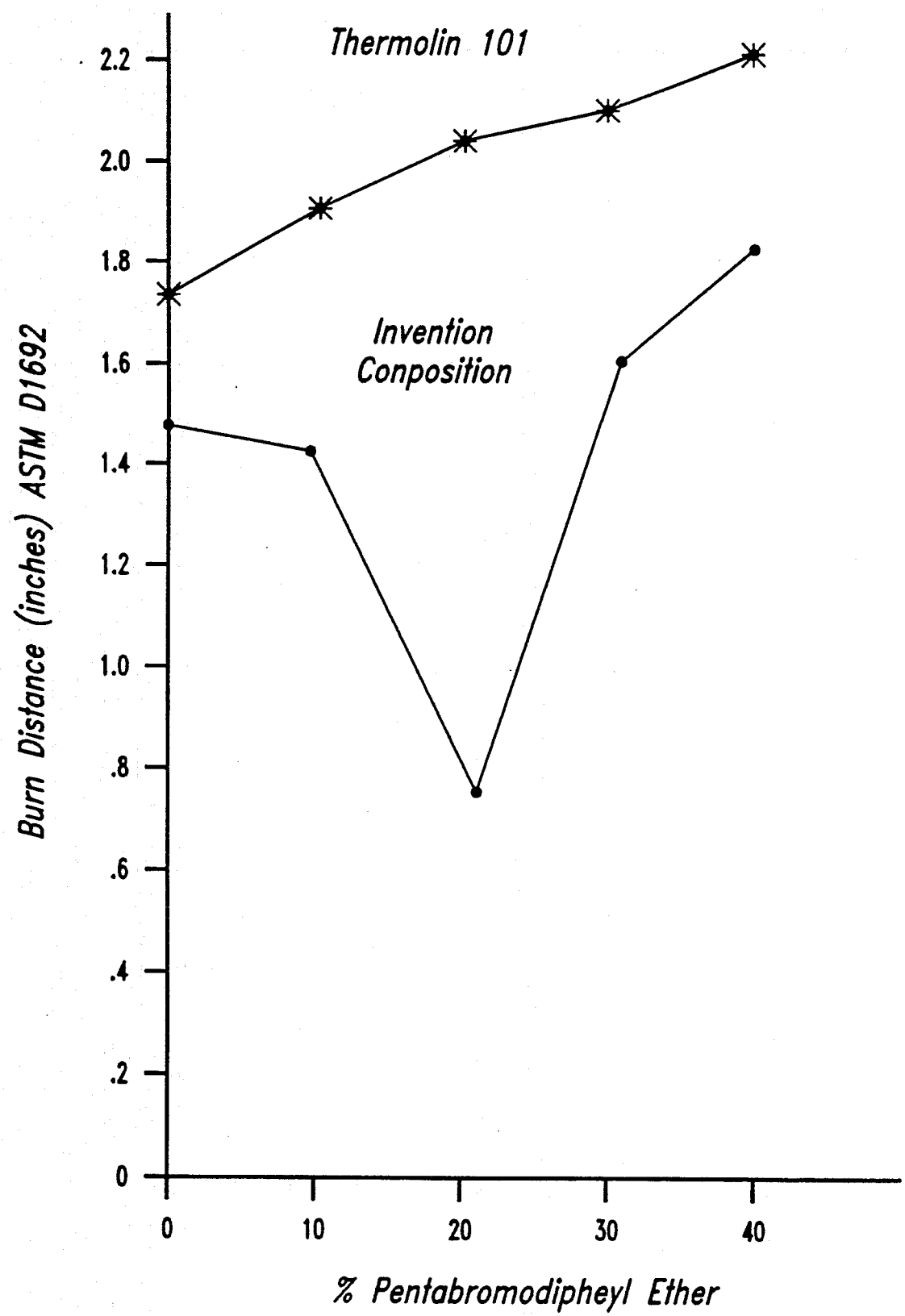
FIG. 1 is a plot of data demonstrating the effectiveness of the present invention, and particularly showing the burn distance observed for compositions having various amounts of pentabromodiphenyl ether and halogenated alkyl phosphate esters.

The foregoing and other objects, advantages, and features of this invention may be achieved with flame retardant additive composition comprising pentabromodiphenyl ether and non-mutagenic mixtures consisting essentially of compounds of the formula:

$$\text{BrCH}_2\overset{\overset{\displaystyle CH_3}{|}}{\underset{\underset{\displaystyle CH_3}{|}}{C}}-CH_2O-\overset{\overset{\displaystyle O}{\|}}{\underset{\underset{\displaystyle OCH_2CH_2Cl}{|}}{P}}-OCH_2CH_2Cl \quad (I)$$

$$\text{BrCH}_2\overset{\overset{\displaystyle CH_3}{|}}{\underset{\underset{\displaystyle CH_3}{|}}{C}}-CH_2O-\overset{\overset{\displaystyle O}{\|}}{\underset{\underset{\displaystyle OCH_2CH_2Br}{|}}{P}}-OCH_2CH_2Cl \quad (II)$$

$$\text{BrCH}_2\overset{\overset{\displaystyle CH_3}{|}}{\underset{\underset{\displaystyle CH_3}{|}}{C}}-CH_2O-\overset{\overset{\displaystyle O}{\|}}{\underset{\underset{\displaystyle OCH_2CH_2Br}{|}}{P}}-OCH_2CH_2Br \quad (III)$$

The foregoing mixtures preferably embody the Compounds (I), (II), and (III) in the following ratios, as determined by vapor phase chromatography ("VPC") area analysis:

| | |
|---|---|
| Compound (I) | 1.0 |
| Compound (II) | 1.5 |
| Compound (III) | 1.0 |

The flame retardant additive compositions of this invention preferably comprise at least 10–30% by weight pentabromodiphenyl ether and about 70–90% by weight of the mixture. The invention also encompasses flame retarded flexible polyurethane foams incorporating effective amounts of the flame retardant additive composition of this invention.

DETAILED DESCRIPTION OF THE INVENTION

Flame-retardant additive compositions comprise pentabromodiphenyl ether and mixtures of the following halogenated alkyl phosphates:

$$\text{BrCH}_2\overset{\overset{\displaystyle CH_3}{|}}{\underset{\underset{\displaystyle CH_3}{|}}{C}}-CH_2O-\overset{\overset{\displaystyle O}{\|}}{\underset{\underset{\displaystyle OCH_2CH_2Cl}{|}}{P}}-OCH_2CH_2Cl \quad (I)$$

$$\text{BrCH}_2\overset{\overset{\displaystyle CH_3}{|}}{\underset{\underset{\displaystyle CH_3}{|}}{C}}-CH_2O-\overset{\overset{\displaystyle O}{\|}}{\underset{\underset{\displaystyle OCH_2CH_2Br}{|}}{P}}-OCH_2CH_2Cl \quad (II)$$

$$\text{BrCH}_2\overset{\overset{\displaystyle CH_3}{|}}{\underset{\underset{\displaystyle CH_3}{|}}{C}}-CH_2O-\overset{\overset{\displaystyle O}{\|}}{\underset{\underset{\displaystyle OCH_2CH_2Br}{|}}{P}}-OCH_2CH_2Br \quad (III)$$

Most desirably, Compounds (I), (II), and (III) are present in the mixture in a VPC area ratio of about 1.0:1.5:1.0.

The mixture of halogenated alkyl phosphates in accordance with this invention is described in detail in U.S. Pat. No. 4,696,963, the disclosure of which is incorporated herein by reference.

The term "pentabromodiphenyl ether" as used herein encompasses not only the pure compound $C_{12}H_5OBr_5$ but also mixtures of polybrominated diphenyl ethers in which the pentabrominated species, $C_{12}H_5OBr_5$, predominates.

The flame retardant additive composition of this invention preferably comprises about 10–30 percent, especially about 20 percent, pentabromodiphenyl ether and about 70–90 percent, especially about 80 percent, of the mixture of compounds I, II and III.

APPLICATION

Effective amounts of the flame retardant additive compositions of this invention may be incorporated as a flame retardant in flexible polyurethane foams by techniques which are standard or known to those skilled in the art. See, for example, J. M. Lyons, "The Chemistry and Uses of Fire Retardants", Wiley-Interscience, New York, N.Y. (1970), and Z. E. Jolles, "Bromine and Its Compounds", Academic Press, New York, N.Y. (1966).

Depending on the degree of flame retardancy desired, greater than 0 up to about 15 weight percent of the flame retardant additive composition may be incorporated in the polyurethane foam. In most applications, it is preferred to use about 0.5 to 10 weight percent of the compositions of this invention.

It is to be understood that the term polyurethanes as used herein means polymers containing repeated urethane linkages:

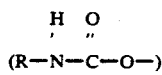

where R is an aromatic or aliphatic group. These polymers are generally made by reacting a polyisocyanate with a compound having a plurality of hydroxyl groups.

Thus the polyurethanes used in the present invention compositions are any polyurethane herein defined and which one so desires to flame retard. It is to be understood that the polyurethanes used can be a "virgin" material, i.e., substantially free of additives such as stabilizers, plasticizers, dyes, pigments, fillers, and the like, or the polyurethanes can have additives (such as those mentioned and described herein) already contained therein or added concurrently with or after the addition of the phosphate compounds of formula I. The advantages of this invention may also be achieved with rebond material. The polyurethane compositions especially and preferably include flexible foams.

It is also within the scope of the present invention to employ other materials in the present invention compositions where one so desires to achieve a particular end result. Such materials include, without limitation, adhesion promoters; antioxidants; antistatic agents; antimicrobials; colorants; plasticizers, etc., such as those listed on pages 594–655: Modern Plastics Encyclopedia, 1984–1985 (in addition to the new class of flame retardants described herein); heat stabilizers; light stabilizers; pigments: plasticizers; preservatives; ultraviolet stabilizers and fillers. In this latter category, i.e., fillers, there can be mentioned without limitation, materials such as glass, carbon, cellulosic fillers (wood flour, cork, and shell flour): calcium carbonate (chalk, limestone, and precipitated calcium carbonate); metal flakes; metallic oxides (aluminum, beryllium oxide and magnesia): metallic powders (aluminum, bronze, lead, stainless steel and zinc); polymers (comminuted polymers and elastomerplastic blends); melamine, silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials including filler, are more fully described in Modern Plastics Encyclopedia, ibid., and which publication has been incorporated herein in toto by reference.

The amount of the above described materials employed in the present invention compositions can be any quantity which will not substantially adversely affect the desired results derived from the present invention compositions. Thus, the amount used can be any amount up to that percent based on the total weight of the composition at which said composition can still be classified as a plastic. In general, such amount will be from about 0% to about 75% and more specifically from about 1% to about 50%.

For a detailed description of various polyurethane preparations of specific elastomers and specific rigid and flexible foams, one is directed to the literature and patents wherein may be found numerous such detailed descriptions, e.g., K. C. Frisch and J. H. Saunders, "Plastic Foams", Vol. 1, parts 1 and 2, Marcel Dekker, Inc., New York, N.Y. 1972.

The following example is provided for the purpose of further illustration of polymer applications employing the mixtures of this invention.

EXAMPLE 1

Polyurethane Foams for Automotive Applications

Polyurethane foams were prepared using a conventional one-shot process employing 3500 MW glycerin-based heteropolyol, toulene diisocyanate and other conventional ingredients. A series of experimental flexible polyurethane foam compositions were prepared containing about 10 weight percent flame retardant additive compositions containing varying amounts of pentabromodiphenyl oxide and the halogenated alkyl phosphate mixture. The additive compositions contained from zero to 40% pentabromodiphenyl oxide. For comparative purposes, mixtures of pentabromodiphenyl oxide with another halogenated phosphate ester, Thermolin 101 commercially available from Olin Corporation, were also produced.

Flame retardance data were obtained using ASTM D1692. A plot of ASTM D1692 burn distance in inches versus pentabromodiphenyl ether content is given for the various test formulations is shown in FIG. 1. These data show that for the comparative compositions, as the amount of pentabromodiphenyl oxide is increased, the ASTM D1692 burn distance in fact increases, representing a loss in flame retardancy. In contrast, the invention composition shows a sharp reduction in flammability between about 10 and 30 percent pentabromodiphenyl ether, with the best results being noted in compositions containing about 80 percent of the halogenated alkyl phosphate mixture and about 20 percent pentabromodiphenyl ether.

We claim:

1. A flame retardant additive composition comprising about 10 to 30% by weight pentabromodiphenyl ether and about 70 to 90% by weight of a non-mutagenic halogenated alkyl phosphate ester mixture consisting essentially of compounds of the formula:

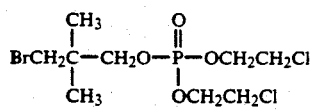 (I)

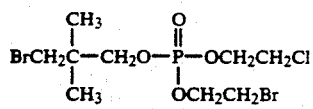 (II)

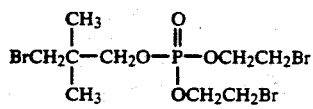 (III)

2. A composition, as claimed in claim 1, wherein the ratio of compounds (I):(II):(III) in the mixture, as determined by vapor phase chromatographic area analysis, is about 1.0:1.5:1.0.

3. Flexible polyurethane foam compositions having incorporated therein an effective amount of a flame-retardant additive composition comprising about to 10 to 30% by weight pentabromodiphenyl ether and about 70 to 90% by weight of a non-mutagenic halogenated alkyl phosphate ester mixture consisting essentially of compounds of the formula:

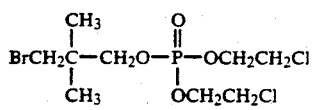 (I)

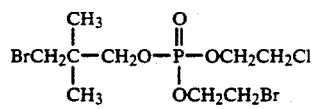 (II)

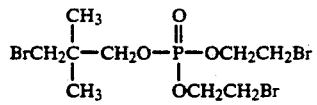 (III)

4. Flexible polyurethane foam compositions, as claimed in claim 3, wherein the ratio of compounds (I):(II):(III) in the mixture, as determined by vapor phase chromatographic area analysis, is about 1.0:1.5:1.0.

5. Flexible polyurethane foam compositions, as claimed in claim 3, wherein the amount of flame retardant additive composition is greater than 0 up to about 15 percent by weight of the foam composition.

6. Flexible polyurethane foam compositions, as claimed in claim 1, in which the flame-retardant additive composition comprises about 15 to 25% by weight pentabromodiphenyl ether and about 75 to 85% by weight of the non-mutagenic halogenated alkyl phosphate ester mixture.

7. Flexible polyurethane foam compositions, as claimed in claim 1, in which the flame-retardant additive composition comprises about 20% by weigh pentabromodiphenyl ether and about 80% by weight of the non-mutagenic halogenated alkyl phosphate ester mixture.

* * * * *